(12) United States Patent
Adkins et al.

(10) Patent No.: US 6,406,744 B1
(45) Date of Patent: Jun. 18, 2002

(54) METHOD OF MANUFACTURING ELECTRODES BY GAS ATOMISATION OF MOLTEN METALS

(75) Inventors: Nicholas John Elsworth Adkins, Nantwich; Stephen Michael Andrew Sillitto, New Castle-Under-Lyme; George Yiasemides, Baldwins Gates, all of (GB)

(73) Assignee: British Ceramic Research Limited, Staffordshire (GB)

( * ) Notice: Subject to any disclaimer, the term of this patent is extended or adjusted under 35 U.S.C. 154(b) by 0 days.

(21) Appl. No.: 09/481,280

(22) Filed: Jan. 11, 2000

Related U.S. Application Data

(63) Continuation of application No. 09/091,703, filed as application No. PCT/GB96/03250 on Dec. 27, 1996, now abandoned.

(30) Foreign Application Priority Data

Jan. 4, 1996 (GB) .............................. 9600070

(51) Int. Cl.[7] .................................. B05D 1/08
(52) U.S. Cl. ................. 427/123; 427/446; 427/456; 427/360; 204/290 R; 204/293
(58) Field of Search ................. 427/446, 455, 427/456, 360, 376.8, 123; 204/284, 290 R, 292, 293

(56) References Cited

U.S. PATENT DOCUMENTS

| | | | |
|---|---|---|---|
| 3,637,437 A | | 1/1972 | Goldberger |
| 3,670,400 A | | 6/1972 | Singer |
| 3,826,301 A | * | 7/1974 | Brooks |
| 4,279,709 A | | 7/1981 | McIntyre et al. |
| 5,492,543 A | * | 2/1996 | Lim |

FOREIGN PATENT DOCUMENTS

| | | | |
|---|---|---|---|
| DE | 1 671 976 A | | 4/1967 |
| EP | 0 225 080 A | | 6/1987 |
| GB | 737373 A | | 9/1955 |
| GB | 1145357 A | | 3/1969 |
| JP | 04262852 | | 9/1992 |
| JP | 05062671 | | 3/1993 |
| WO | 92/10307 | * | 6/1992 |

* cited by examiner

Primary Examiner—Fred J. Parker
(74) Attorney, Agent, or Firm—Adams, Schwartz & Evans, P.A.

(57) ABSTRACT

A method of forming an electrode is characterized in that the method comprising forming a porous coating of an alloy by gas atomisation on a substrate. The porosity of the coating is provided by controlling one or more conditions selected from the group consisting of the height and duration of deposition of the spray onto the substrate, the rate deposition, the speed of the atomized particles impacting on the substrate size distribution of the spray droplets, the temperature above melting, the substrate temperature, the substrate thermal conductivity, the conductivity of the gas, and the temperature of the gas.

19 Claims, No Drawings

METHOD OF MANUFACTURING ELECTRODES BY GAS ATOMISATION OF MOLTEN METALS

This application is a 37 C.F.R. §1.53(b) continuation of U.S. patent application Ser. No. 09/091,703 filed on Jun. 19, 1998 abandoned which is a 371 of PCT/GB96/03250 filed Dec. 27, 1996.

This invention concerns a method of producing electrodes, and particularly but not exclusively negative electrodes, and more especially negative electrodes for batteries; and also electrodes made by such a method.

TECHNICAL FIELD

Flat negative electrodes for nickel metal hydride batteries are conventionally manufactured by the following process. An ingot is cast of the appropriate nickel hydride alloy. Powder is then produced from the ingot by one or more of grinding, crushing, milling or decrepitation. The powder is then mixed with a binder such as a suitable polymer material, and a conducting medium such as carbon. The mixture is then pressed or rolled onto a perforated nickel sheet and formed into a sandwich with a further such sheet.

Gas atomisation is an existing technique used in the production of powders. Variants of this technique for example are used for the production of coated strips or plate by spraying, whilst alleviating the requirement for rolling. This technique is used to provide a non-porous metal coating or solid ingot as near as possible to full density. The technique comprises melting the metal of the coating or ingot which is then passed through an orifice to form a stream. The stream is subsequently passed through a jet or jets of gas which impact the stream to provide atomisation thereof. The atomised particles are projected to deposit on a substrate or allowed to freeze in-flight into powder.

SUMMARY OF THE INVENTION

According to the present invention there is provided a method of forming an electrode, the method comprising forming a porous coating of a required alloy by gas atomisation on a substrate.

The porosity of the coating is preferably greater than 13%, and desirably greater than 50%. The substrate is preferably also porous.

The porosity of the coating is preferably provided by controlling one or more of: the height of deposition of the spray onto the substrate; the rate of deposition; the duration of deposition; the speed of the atomised particles impacting on the substrate; the size distribution of the spray droplets; the melt super heat; the temperature about melting point. the substrate temperature; the substrate thermal conductivity: the conductivity of the gas; the temperature of the gas.

The alloy preferably comprises a nickel hydride alloy, and desirably MMNiAlMnCo. The abbreviation "MM" is used herein to refer to a combination of rare earth metals known in the art as "misch metal."

The substrate is preferably metaalic, and may be of nickel or copper, and may be in the form of a solid sheet, perforated sheet or gauze.

The relative position of the substrate is preferably changed during deposition to provide a substantially even deposition thereon The substrate may be moved; and/or the direction of gas flow against the melted alloy may be moved; and/or the direction of flow of the alloy may be moved. The substrate is preferably turned over at least once to provide deposition on opposite sides thereof.

The method is preferably carried out in an inert gas atmosphere, such as argon.

A member is preferably provided to collect overspray, and said member may comprise a container locatable beneath the substrate.

The substrate is preferably rolled to a required thickness following spraying. The substrate may be subject to a heat treatment after spraying.

The invention also provides an electrode made by a method according to any of the preceding nine paragraphs.

The electrode is preferably a negative electrode, and desirably a battery electrode.

DESCRIPTION OF THE PREFERRED EMBODIMENTS AND BEST MODE

Embodiments of the present invention will now be describe by way of example only.

A melt of a nickel hydride alloy with a desired composition is produced by heating. The temperature is raised above the liquidus of the alloy and the melt is then poured through a nozzle. At the tip of the nozzle the melt is disrupted by a high energy jet or jets, or a continuous shroud is formed by an annulus, of gas, and melt droplets are produced.

The melt droplets are directed at a perforated substrate. A mixture of solidified, partly solidified and liquid droplets of the melt, impact on the substrate where they solidify into a porous sheet. The process is adjusted to control the porosity and micro structure. In particular the height of deposition of the alloy is adjusted accordingly. The rate and/or duration of deposition can be adjusted. The speed of the atomised particles impacting on the substrate can be adjusted by varying the gas velocity. The size distribution of the spray droplets can be arranged using the die design and/or the amount of gas and metal flowing. The melt super heat, i.e. the temperature above melting point, can be adjusted. Any of the substrate temperature, substrate thermal conductivity, gas conductivity and gas temperature can be adjusted or determined as required.

Following atomisation and before deposition, some of the alloy droplets begin to solidify from the outside of the particles. Where little or no solidification has taken place the particles will spread considerably upon deposition, and thereby reduce porosity. If however a particle is either solid or semi-solid, the particle is unlikely to be sufficiently deformed to produce a cohesive coating, but instead it forms a porous layer.

To produce a sheet with the desired thickness and width of coating, the substrate and/or the nozzle and/or the melt spray can be moved. The deposition is carried out in an inert gas atmosphere such as argon. The atomisation of the particles tends to produce consistent size distribution of spherical particles which provide a regular flow, though if conditions are not carefully monitored this will tend to lead to low porosity. Overspray is collected in a container beneath the substrate. The substrate is coated on both sides, and it may be necessary to turn the substrate over a number of times to provide satisfactory layers.

The coated sheet is rolled following spraying, to adopt a required thickness, and the sheet could be formed as a continuous strip which can be cut into required lengths. The coated sheet could be subjected to a heat treatment.

Specific examples of the materials and conditions for producing electrodes according to the invention are provided in the table below.

| EXAMPLE | I | II | III |
|---|---|---|---|
| Deposited Material | MMNiAlMnCo | MMNiAlMnCo | MMNiAlMnCo |
| Pouring temperature °C. | 1450 | 1450 | 1500 |
| Metal pouring nozzle diameter mm | 2.5 | 2.5 | 2.5 |
| Substrate Material | Nickel | Nickel | Nickel |
| Substrate distance from nozzle cm | 40 | 84 | 35 |
| Atomising Gas | Argon | Argon | Argon |
| Substrate dimensions mm | 1 × 125 × 140 | 1× 125 × 140 | 0.02 × 41 × 180 |
| Melt flow rate kg min$^{-1}$ | 2.39 | 1.18 | 0.95 |
| Gas/Metal Mass Ratio | 0.77 | 1.16 | 0.73 |
| Deposit Thickness mm | 1 | 1 | 0.010 |
| Deposit Porosity % | 59 | 50 | 60 |

| EXAMPLE | IV | V | VI |
|---|---|---|---|
| Deposited Material | MMNiAlMnCo | MMNiAlMnCo | MMNiAlMnCo |
| Pouring temperature °C. | 1500 | 1550 | 1500 |
| Metal pouring nozzle diameter mm | 2.5 | 2.5 | 2.7 |
| Substrate Material | Nickel | Copper | Copper |
| Substrate distance from nozzle cm | 31 | 40 | 50 |
| Atomising Gas | Argon | Argon | Argon |
| Substrate dimensions mm | 0.02 × 41 × 30 | 0.02 × 41× 90 | 0.02 × 41 × 90 |
| Melt flow rate kg min$^{-1}$ | 2.54 | 2.01 | 1.50 |
| Gas/Metal Mass Ratio | 1.60 | 1.16 | 1.23 |
| Deposit Thickness mm | 0.019 | 0.008 | 0.021 |
| Deposit Porosity % | 75 | 55 | 58 |

These examples produced alloys with considerably increased electrochemical performance relative to alloys produced with similar materials by a standard technique, and particularly when specific properties were considered. The above examples were produced in trial conditions and for a commercial process the metal flow rates could be much higher such as for example 50–100 kg/mn. The porosity is an "apparent porosity" in that any recesses or other structures extending inwardly from the surface of the deposit are counted as part of the porosity.

There is thus described a method of producing an electrode,, and an electrode produced by this method with considerable advantages over the conventional method and electrodes produced thereby. This method allows a one step production of negative electrodes for batteries. The electrodes could be flat for prismatic batteries, or rolled for cylindrical batteries.

The method alleviates the steps of having to form a powder of alloy and subsequently mix the alloy with other materials. The invention does not require the handling of pyrophoric powder as is conventional. The electrode is produced without a binder thereby increasing the specific capacity of the battery. Cost savings are achieved in not having to provide extra materials and processes. Furthermore, electrodes made according to the present invention can be recycled much more readily due to the absence of additional materials.

The process used in the invention can readily be controlled and thus an optimum porosity and micro structure can be obtained. The process is completed in an inert gas atmosphere which thus produces a product with a low oxygen content. The process involves rapid cooling which tends to lead to an electrode with higher capacity than by alternative production routes. The rapid cooling also improves the cycle life of the electrode. The gas atomisation process used tends to provide spherical particles of consistent composition whose behaviour is more predictable. Such particles also tend to be more durable and thus can be recharged a greater number of times.

The procedure tends to arrest segregation of impurities within the grains sand at grain boundaries. Overspray powder can be used as a biproduct for battery production using loose powder. The method allows material such as nickel hydride to be formed on an electrode in a very thin layer which permits higher charging and discharging rates.

It is to be realised that the invention could be used to make electrodes other than nickel hydride alloys. Obviously for other electrodes would require the melting of appropriate materials and deposition onto appropriate substrates. Whilst the embodiments use perforated nickel or copper substrates, the substrates could be in the form of gauzes, or sometimes thin solid sheets. Copper has a higher conductivity than nickel, and as it has a lower melting point a better bond with the electrode material is generally obtained.

Various other modifications may be made without departing from the scope of the invention. For example the process could be carried out in a different atmosphere. Other different conditions could be applied other than those in the examples.

What is claimed is:

1. A method of forming an electrode, which electrode comprises a porous coating having a porosity, of greater than 55% by volume and a substrate, said substrate being selected from the group consisting of a perforated sheet and gauze, wherein the method comprises forming the porous coating of an alloy by gas atomisation on the substrate; the gas atomisation comprising melting the alloy to cause a stream of molten alloy to flow through a nozzle, directing a stream of gas onto the molten alloy stream downstream of the nozzle to cause formation of droplets on the alloy, which droplets are urged onto the substrate; the porosity of the coating being provided by controlling one or more conditions selected from the group consisting of the height and duration of deposition of the spray onto the substrate, the rate of deposition, the speed of the atomized particles impacting on the substrate, the size distribution of the spray droplets, the temperature above melting, the substrate temperature, the substrate thermal conductivity, the conductivity of the gas, and the temperature of the gas.

2. A method according to claim 1, characterised in that the substrate is also porous.

3. A method according to claim 1, characterised in that the substrate comprises nickel.

4. A method according to claim 1, characterised in that the substrate comprises copper.

5. A method according to claim 1, characterised in that the alloy comprises a nickel hydride alloy.

6. A method according to claim 5, characterised in that the alloy comprises MMNiAlMnCo.

7. A method according to claim 1, characterised in that the relative position of the substrate is changed during deposition to provide a substantially even deposition thereon.

8. A method according to claim 7, characterised in that the substrate is moved; and/or the direction of gas flow against the melted alloy is moved; and/or the direction of flow of the alloy is moved.

9. A method according to claim 1, characterised in that the substrate is turned over at least once to provide deposition on opposite sides thereof.

10. A method according to claim 1, characterized in that the method is carried out in an inert gas atmosphere.

11. A method according to claim 10, characterised in that the inert gas is argon.

12. A method according to claim 1, characterised in that the substrate is rolled to a required thickness following spraying.

13. A method according to claim 1, characterised in that the substrate is subject to a heat treatment after spraying.

14. A method according to claim 1, characterised in that a member is provided to collect overspray.

15. A method according to claim 14, characterised in that said member comprises a container locatable beneath the substrate.

16. A method according to claim 1, wherein the gas stream is directed onto the molten alloy stream immediately downstream of the nozzle.

17. An electrode, characterised in that the electrode is made by a method according to claim 1.

18. An electrode according to claim 16, characterised in that the electrode is a negative electrode.

19. An electrode according to claim 16, characterised in that the electrode is battery electrode.

* * * * *

UNITED STATES PATENT AND TRADEMARK OFFICE
CERTIFICATE OF CORRECTION

PATENT NO.    : 6,406,744 B1                                                    Page 1 of 1
DATED         : June 18, 2002
INVENTOR(S)   : Nicholas John et al.

It is certified that error appears in the above-identified patent and that said Letters Patent is hereby corrected as shown below:

Column 6,
Lines 13 and 15, delete "claim 16" and insert -- claim 17 --.

Signed and Sealed this

Ninth Day of March, 2004

JON W. DUDAS
*Acting Director of the United States Patent and Trademark Office*